(12) United States Patent  
Schultz et al.

(10) Patent No.: US 6,504,258 B2  
(45) Date of Patent: Jan. 7, 2003

(54) VIBRATION BASED DOWNHOLE POWER GENERATOR

(75) Inventors: Roger Lynn Schultz, Denton, TX (US); Paul David Ringgenberg, Carrollton, TX (US); Clark Edward Robison, Plano, TX (US); Robert Ken Michael, Plano, TX (US); Russell Irving Bayh, III, Carrollton, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 40 days.

(21) Appl. No.: 09/876,976

(22) Filed: Jun. 8, 2001

(65) Prior Publication Data

US 2001/0040379 A1 Nov. 15, 2001

Related U.S. Application Data

(63) Continuation of application No. 09/493,801, filed on Jan. 28, 2000, now abandoned.

(51) Int. Cl.[7] .................................................. H02P 9/04
(52) U.S. Cl. ........................................ 290/1 R; 310/36
(58) Field of Search ........................... 290/1 R; 175/56, 175/104; 310/311, 334, 339, 15, 26, 30, 36

(56) References Cited

U.S. PATENT DOCUMENTS

| | | | |
|---|---|---|---|
| 3,315,755 A | * 4/1967 | Brooks .......................... 175/56 |
| 3,448,305 A | 6/1969 | Raynal et al. .................. 310/17 |
| 3,506,076 A | * 4/1970 | Angona ........................ 175/104 |
| 3,558,936 A | 1/1971 | Horan .................... 310/323.01 |
| 3,970,877 A | 7/1976 | Russell et al. ............... 310/339 |
| 4,158,368 A | 6/1979 | Clark ........................ 137/487.5 |
| 4,246,765 A | 1/1981 | Zabcik .......................... 464/20 |
| 4,387,318 A | 6/1983 | Kolm et al. ................. 310/330 |
| 4,491,738 A | 1/1985 | Kamp .......................... 290/43 |
| 4,518,888 A | 5/1985 | Zabcik ........................ 310/334 |
| 4,669,068 A | 5/1987 | Klatt .......................... 367/183 |
| 4,772,813 A | 9/1988 | Mohri et al. ................... 310/26 |
| 5,317,223 A | 5/1994 | Kiesewetter et al. ........... 310/26 |
| 5,839,508 A | 11/1998 | Tubel et al. ................ 166/65.1 |
| 5,896,076 A | * 4/1999 | van Namen ................. 335/222 |
| 5,965,964 A | 10/1999 | Skinner et al. ................ 310/15 |
| 5,982,708 A | 11/1999 | Pearce ........................ 367/157 |
| 6,011,346 A | 1/2000 | Buchanan et al. ........... 310/339 |

FOREIGN PATENT DOCUMENTS

| | | | |
|---|---|---|---|
| FR | 2626729 A | 8/1989 |
| GB | 2153410 A | 8/1985 |
| JP | 09163771 A | 6/1997 |

OTHER PUBLICATIONS

Etrema Products, Inc., Product Brochure, Undated.
John V. Bouyoucos, "Self–Excited Hydrodynamic Oscillators", NR–014–903, Technical Memorandum, Dated Jul. 31, 1955.

* cited by examiner

*Primary Examiner*—Joseph Waks  
(74) *Attorney, Agent, or Firm*—Paul I. Herman; Marlin R. Smith; J. Richard Konneker

(57) ABSTRACT

A downhole power generator produces electrical power for use by downhole tools. In a described embodiment, a downhole power generator includes a member that is vibrated in response to fluid flow through a housing. Vibration of the member causes a power generating assembly to generate electrical power.

21 Claims, 17 Drawing Sheets

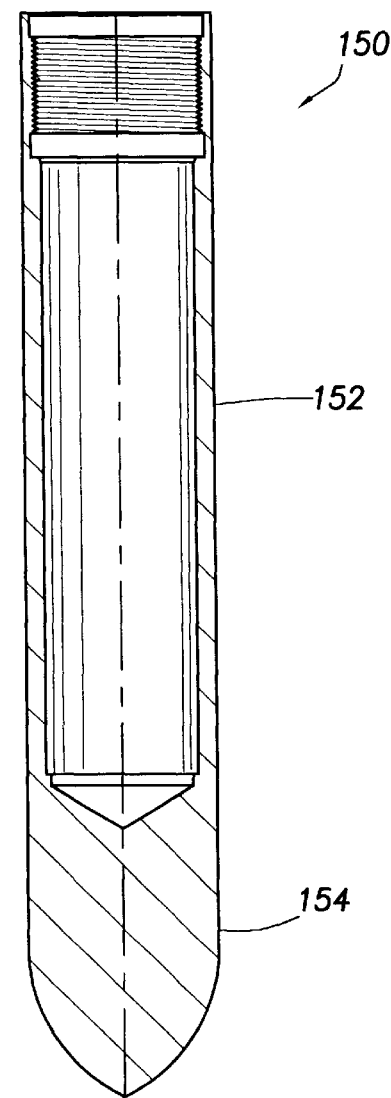
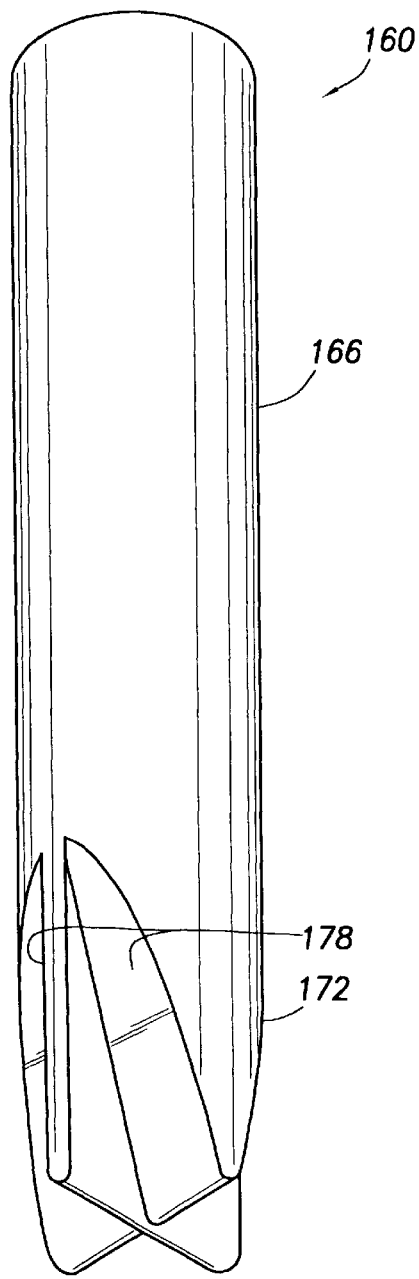
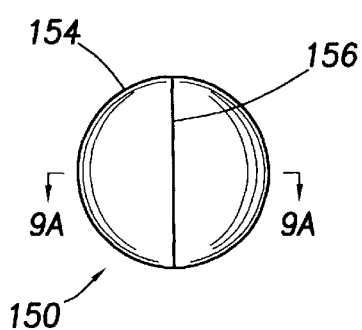
FIG.9
FIG.9A
FIG.10

VIBRATION BASED DOWNHOLE POWER GENERATOR

This is a continuation, of application Ser. No. 09/493,801, filed Jan. 28, 2000, abandoned such prior application being incorporated by reference herein in its entirety.

BACKGROUND OF THE INVENTION

The present invention relates generally to operations and equipment utilized in conjunction with subterranean wells and, in an embodiment described herein, more particularly provides a method and apparatus for generating electrical power downhole.

Power for use in a downhole environment has generally in the past been either stored in a device, such as a battery, and conveyed downhole or it has been transmitted via conductors, such as a wireline, from the space or another remote location. As is well known, batteries have the capability of storing only a finite amount of power therein and have environmental limits, such as temperature, on their use. Additionally, batteries are not readily recharged downhole.

Electrical conductors, such as those in a conventional wireline, provide a practically unlimited amount of power, but require special facilities at the surface for deployment and typically obstruct the production flowpath, thereby preventing the use of safety valves, limiting the flow rate of fluids through the flowpath, etc. while the conductors are in the flowpath. Thus, wireline operations are typically carried out prior to the production phase of a well, or during remedial operations after the well has been placed into production.

What is needed is a method of generating electrical power downhole. The method should not require that power be stored in a device and then convened downhole where it is difficult to recharge. The method should also not require that power be transmitted from a remote location via one or more conductors positioned in a production flowpath of a well. It is accordingly an object of the present invention to provide a method whereby power is generated downhole, and to provide an apparatus for such power generation.

SUMMARY OF THE INVENTION

In carrying out the principles of the present intention, in accordance with an embodiment thereof, a downhole power generator is provided in which fluid flow therethrough causes vibration of a member therein. Vibration of the member is used to produce electrical power.

In one aspect of the present invention, the member is elongated and extends into a flow passage formed through a housing. As fluid flows through the flow passage, the member vibrates. The member may be secured to the housing at one end, with the other end facing into the fluid flow. Alternatively, the secured end may face in the direction of the fluid flow. The member may be configured to enhance the amplitude and/or frequency of its vibration.

Vibration of the member may be used to generate electrical power in a variety of manners. A power generating assembly may be attached to the member so that, as the member vibrates, the power generating assembly is displaced therewith. Displacement of the power generating assembly causes electrical power to be generated.

For example, the power generating assembly may include a coil and a magnet, with relative displacement being produced between the coil and the magnet as the member vibrates. The power generating assembly may include a piezoelectric material and a mass, with the mass bearing on the piezoelectric material and inducing strain therein as the member vibrates. The power generating assembly may include a piezoelectric material applied to the member, so that strain is induced in the piezoelectric material as the member flexes when it vibrates. The power generating assembly may include a coil and a magnetostrictive material, with strain being induced in the magnetostrictive material as the member vibrates.

In another aspect of the present invention, the member may have a flow passage formed through it, with the member vibrating when fluid is flowed through its flow passage. The member may be in the form of a nozzle or venturi. A varying pressure differential is created across the member as the fluid flows therethrough, causing the member to vibrate. Again, a variety of methods may be used to produce electrical power from the vibration of the member, including inducing strain in a piezoelectric material, inducing strain in a magnetostrictive material, displacing a coil relative to a magnet, etc.

In a further aspect of the present invention, vibration of the member in response to fluid flow may be regulated downhole. For example, the effect of changes in the fluid flow may be regulated by maintaining a velocity of the fluid flow within predetermined limits. Such velocity maintenance may be accomplished, for example, by varying a flow area in response to chances in the fluid flow rate through the flow passage.

These and other features, advantages, benefits and objects of the present invention will become apparent to one of ordinary skill in the art upon careful consideration of the detailed description of representative embodiments of the invention hereinbelow and the accompanying drawings.

BRIEF DESCRIPTION OF THE DRAWINGS

FIGS. 9 & 9A are end and cross-sectional views, respectively, of a first alternate nose for use with the first or second apparatus;

FIG. 10 is an isometric view of a second alternate nose for use with the first or second apparatus;

DETAILED DESCRIPTION

Figure 1:
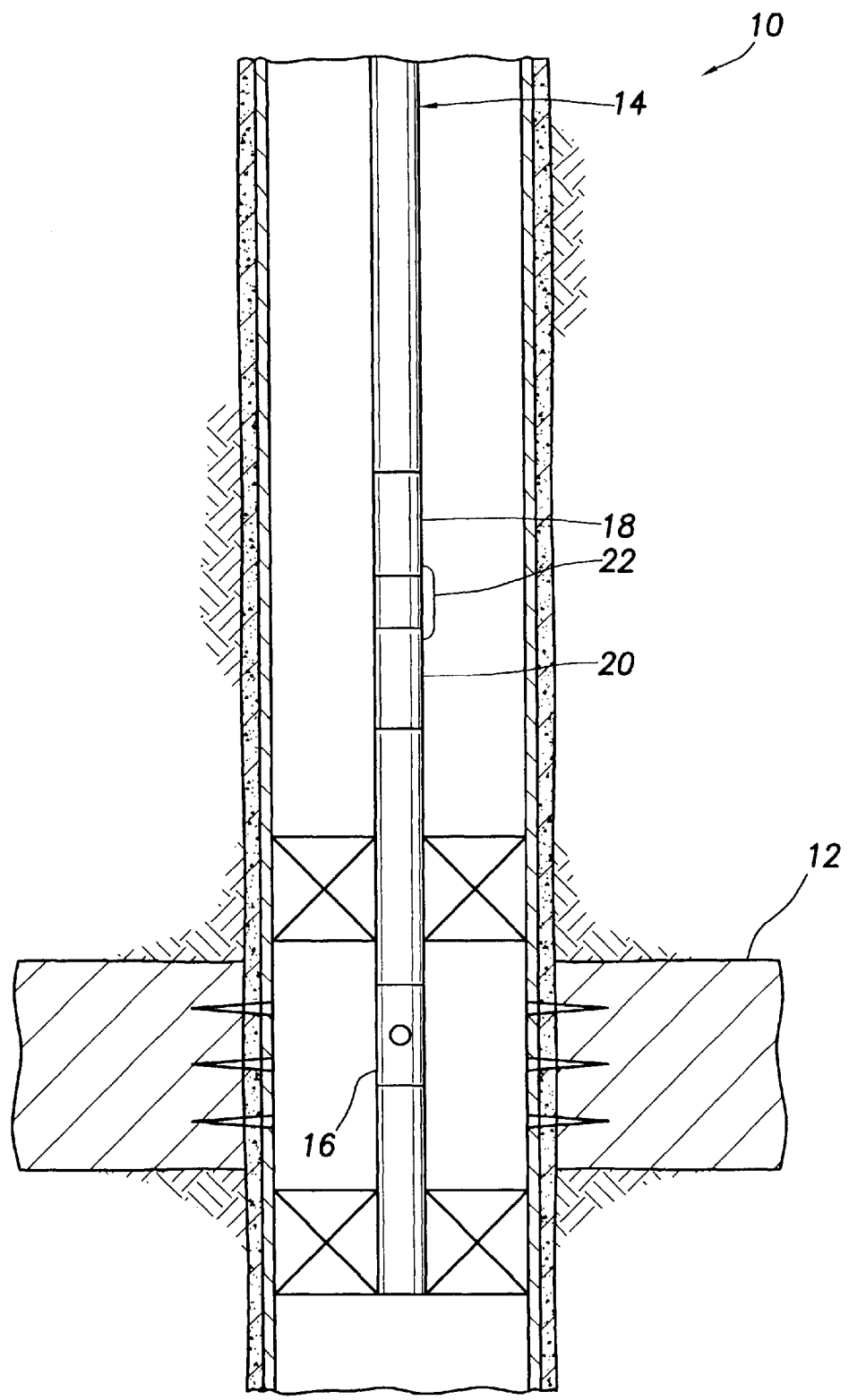
FIG. 1 is a schematic cross-sectional view of a method of generating power downhole embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", etc., are used for convenience in referring to the accompanying draftings. Additionally, it is to be understood that the various embodiments of the present invention described herein may be utilized in various orientations, such as inclined, inverted, horizontal, vertical, etc., without departing from the principles of the present invention.

The method 10 is described herein as being performed in conjunction with a producing well in which fluid is produced from a formation 12 and into a tubular string 14, and is then flowed through the tubular string to the earth's surface. However, it is to be clearly understood that principles of the present invention may be incorporated in other methods, for example, where fluid is injected into a formation or circulated in the well, such as during drilling operations, where fluids pass from a relatively high pressure source to a relatively low pressure zone within the well, or where fluid flows from a pump or other "artificial" pressure source, etc. Thus, it is not necessary, in keeping with the principles of the present invention, for fluid to be produced through a tubular string.

In the method 10 as depicted in FIG. 1, fluid from the formation 12 enters the tubular string 14 through a valve 16 or other opening in the tubular string and flows upwardly in the tubular string. Interconnected in the tubular string 14 is a downhole power generator 18 through which the fluid flows. In one important aspect of the present invention, this fluid flow through the power generator 18 causes it to generate electrical power. This electrical power may then be used to operate a downhole tool, such as a valve 20 interconnected in the tubular string 14. It is to be clearly understood that the naive 20 is used merely as an example of the wide variety of downhole tools that may be powered by the generator 18, such as sensors, samplers, flow control devices, communication devices, etc.

Electric lines or conductors 22 may be used to electrically connect the power generator 18 to the valve 20, enabling the valve to be remotely located relative to the power generator. Alternatively, the power generator 18 and valve 20 (or other downhole tool) may be integrally formed or directly connected to each other. Furthermore, the power generator 18 may be positioned above or below the valve 20, or in any other position relative to the valve.

Referring additionally now to FIGS. 2A–F, a downhole power generator 26 embodying principles of the present invention is representatively illustrated. The power generator 26 may be used for the power generator 18 in the method 10 described above. Of course, the power generator 26 may be used in many other methods, without departing from the principles of the present invention.

Figure 3:
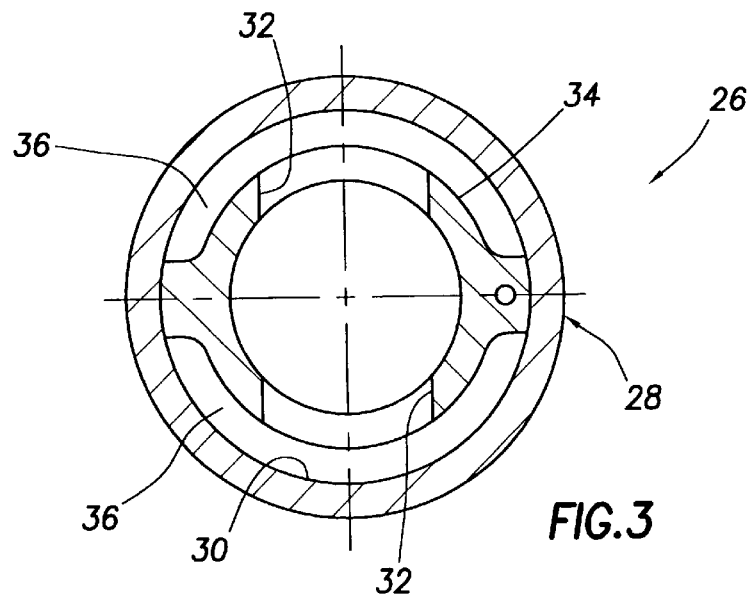
FIG. 3 is a cross-sectional view of a portion of the first apparatus taken alone line 3—3 of FIG. 2B.

The power generator 26 includes an outer generally tubular housing assembly 28 having a flow passage 30 formed generally axially therethrough. The housing assembly 28 is appropriately configured for interconnection in a tubular string, such as the tubular string 14 in the method 10, such that fluid flow through the tubular string also flows through the passage 30. Referring briefly to FIG. 3, it may be seen that the passage 30 is diverted between a central portion of the housing assembly 28 and an outer portion thereof via windows 32 formed radially through an inner generally tubular mandrel portion 34 of the housing assembly. Generally annular voids 36 are formed between the mandrel 34 and the portion of the housing assembly 28 outwardly overlying the mandrel, and these voids are part of the flow passage 30.

Releasably engaged with a profile 38 internally formed in the mandrel 34 is a conventional lock 40 of the type well known to those skilled in the art. For example, the lock 40 may be a Halliburton X-type lock, or any other type of lock. However, it is to be clearly understood that any releasable attachment means may be used in the power generator 26, without departing from the principles of the present invention.

A power generating structure 42 is attached to the lock 40 at a lower end thereof. The power generating structure 42 extends downwardly from the lock 40 and into the passage 30 below the mandrel 34. Note that the power generating structure 42 is axially elongated and has one end (its upper end as depicted in FIGS. 2A–F) secured against displacement relative to the housing assembly 28 by the lock 40 and has its other end (its lower end as depicted in FIGS. 2A–F) extending into the passage 30.

Thus, as shown in FIGS. 2A–F, the power generating structure 42 has its lower end facing into the fluid flow through the passage 30, if the fluid flow is directed upwardly through the housing assembly 28. This would be the case if the power generator 26 were to be used as shown in FIGS. 2A–F for the power generator 18 in the method 10. However, it is to be clearly understood that fluid may flow downwardly through the passage 30, such as in an injection operation, or the power generator 26 may be differently configured so that the lower end of the power generating structure 42 faces in the direction of the fluid flow through the housing, assembly 28, or in another direction, without departing, from the principles of the present invention.

It will be readily appreciated by one skilled in the art that, when fluid flows through the passage 30 about the power generating structure 42, the lower end of the power generating structure will be deflected somewhat laterally relative to the housing assembly 28. This lateral deflection will occur repetitively, with the lower end of the power generating structure 42 oscillating back and forth within the housing assembly 28. Thus, fluid flow through the passage 30 causes the power generating structure 42 to vibrate.

Figure 2A:
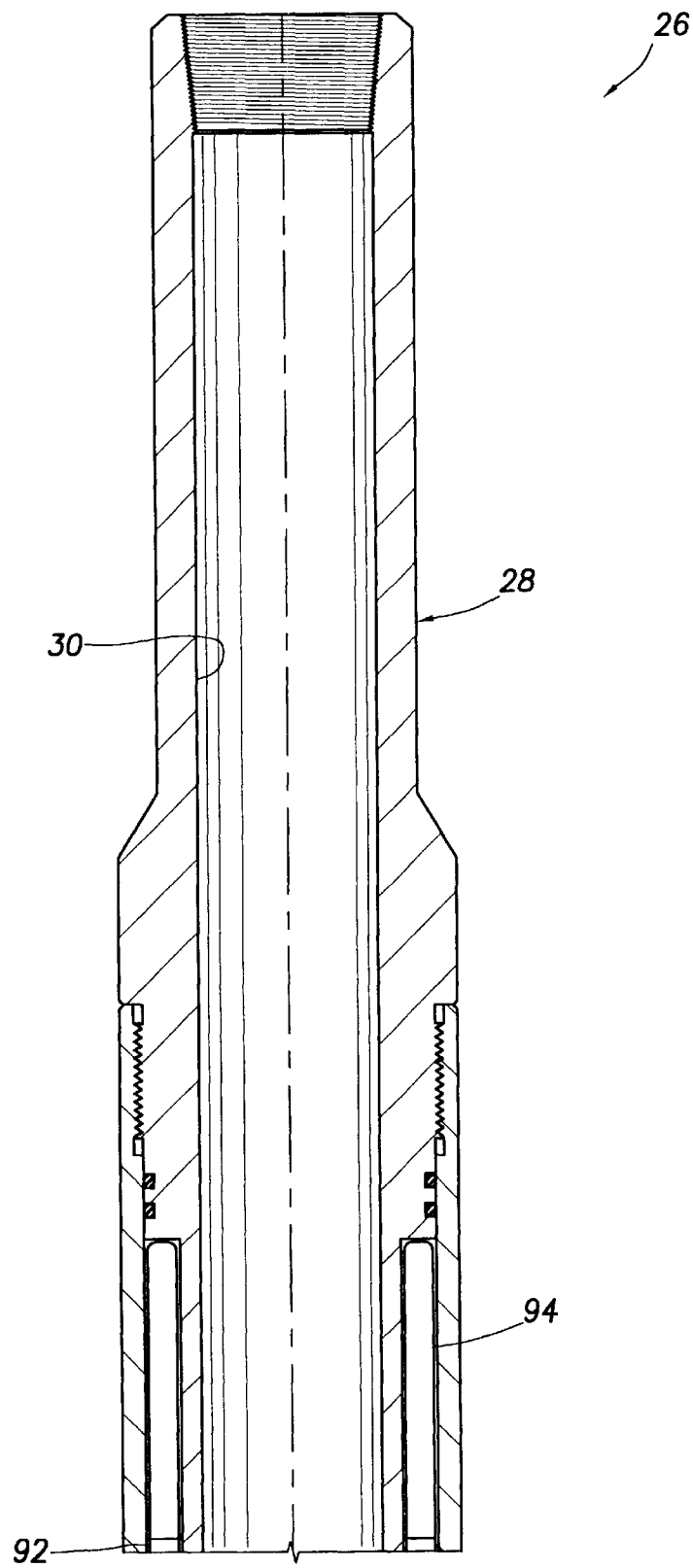
FIGS. 2A–F are cross-sectional views of successive axial sections of a first apparatus usable in the method of FIG. 1.
Figure 2B:
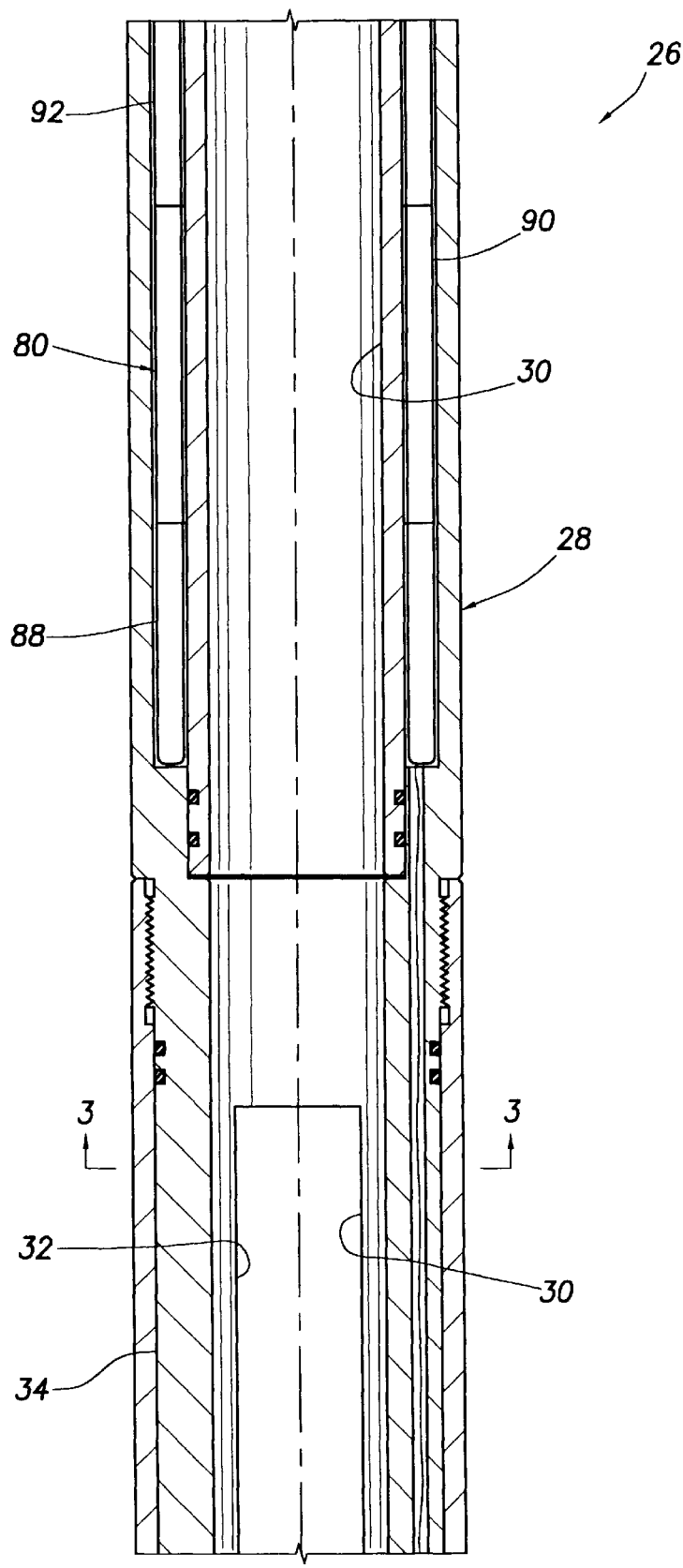
Figure 2C:
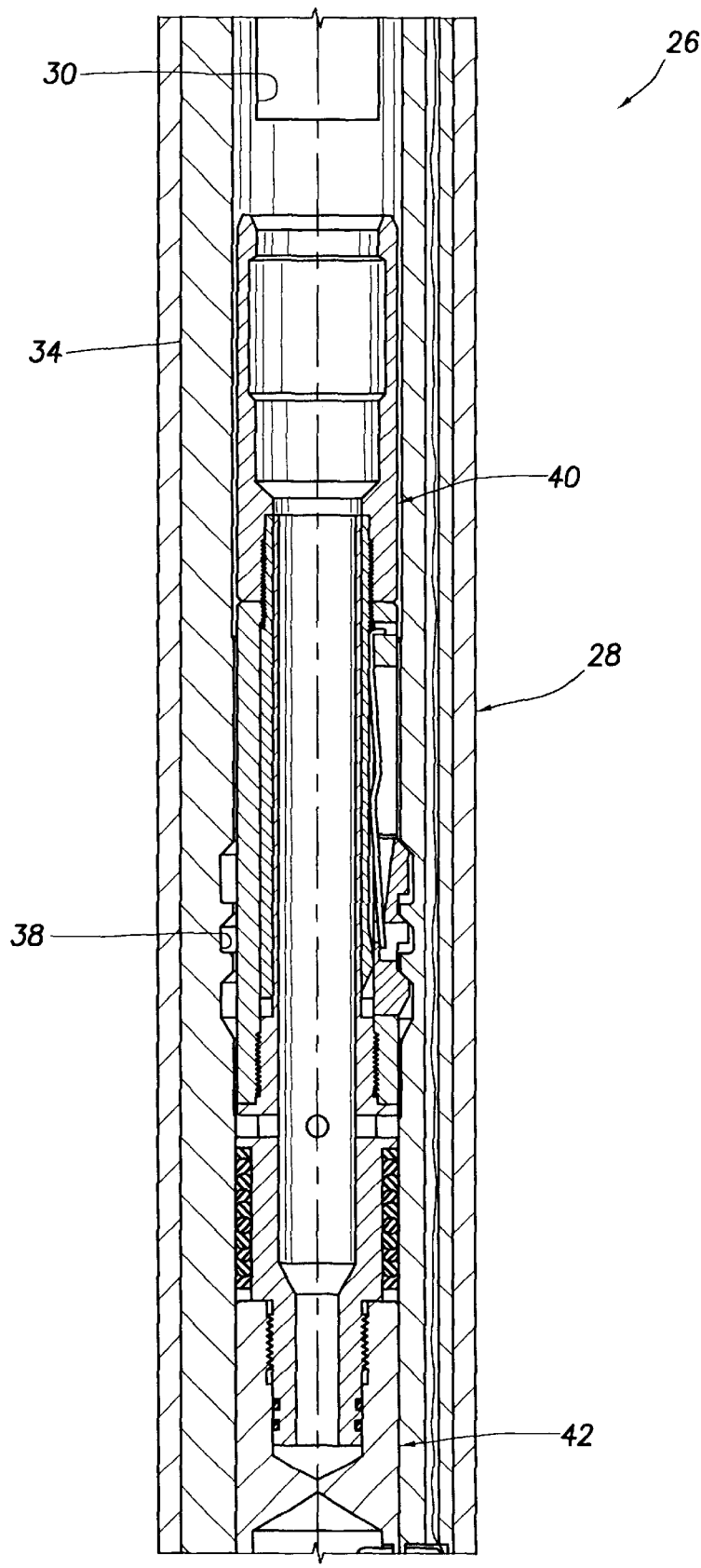
Figure 2D:
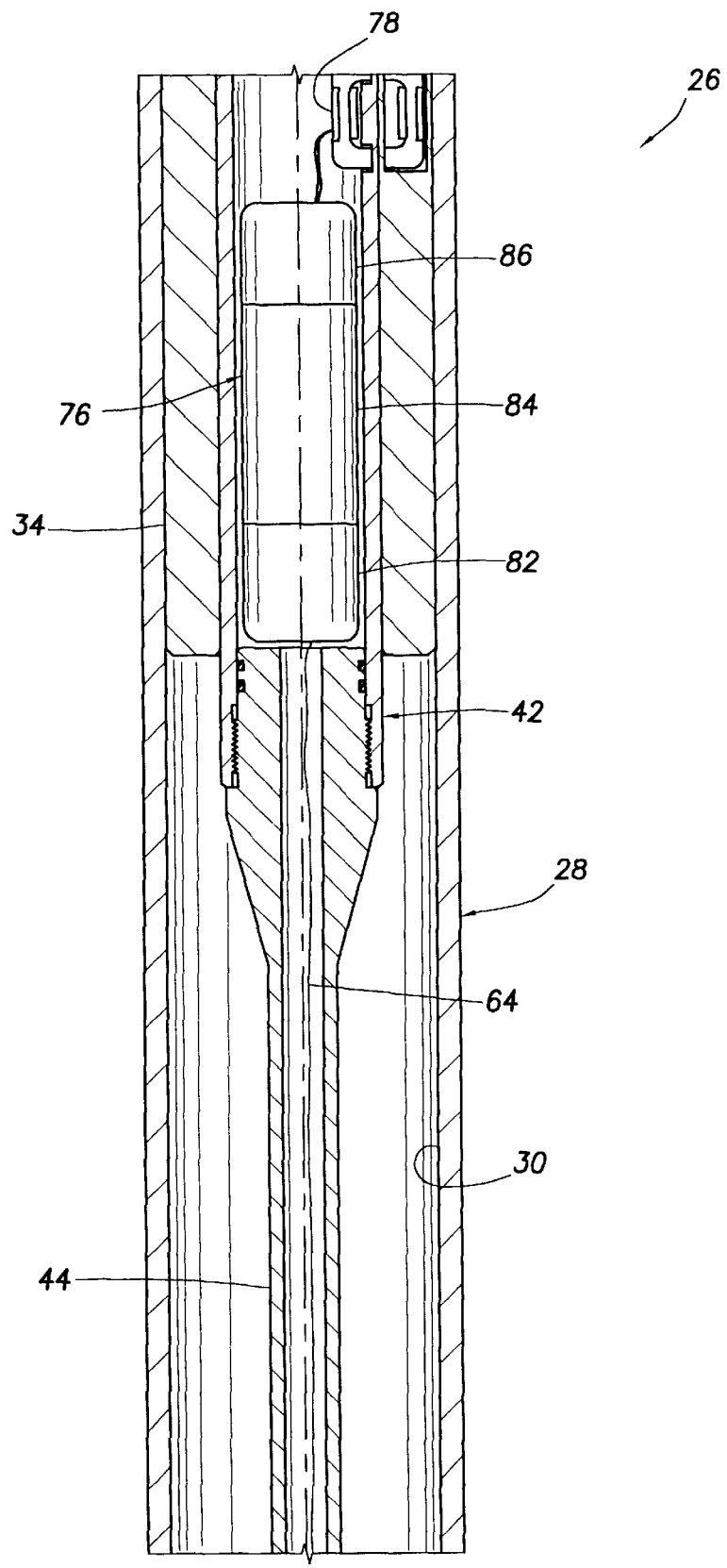

The power generating structure 42 includes an elongated member 44. As depicted in FIGS. 2D & E, the member 44 is generally tubular and is made of a relatively rigid material, such as steel. It will be readily appreciated by one skilled in the art that the frequency at which the power generating structure 42 vibrates in response to the fluid flow through the passage 30 may be varied by changing the configuration and/or material of the member 44. For example, the member 44 may be made of a less rigid material to decrease the vibration frequency, or the wall thickness of the member may be increased to increase the vibration frequency, etc. Therefore, it is to be clearly understood that the configuration and/or the material of the member 44 may be changed, and the frequency of the power generating structure 42 vibration may be changed, without departing from the principles of the present invention.

Attached at a lower end of the member 44 is a substantially hollow nose 46. The nose 46 may be made of a relatively erosion resistant material to resist the effects of the fluid flow through the passage 30 impinging on the nose. It will be readily appreciated that the mass of the nose 46 may be adjusted to vary the frequency at which the power generating structure 42 vibrates in response to the fluid flow through the passage 30.

Figure 2E:
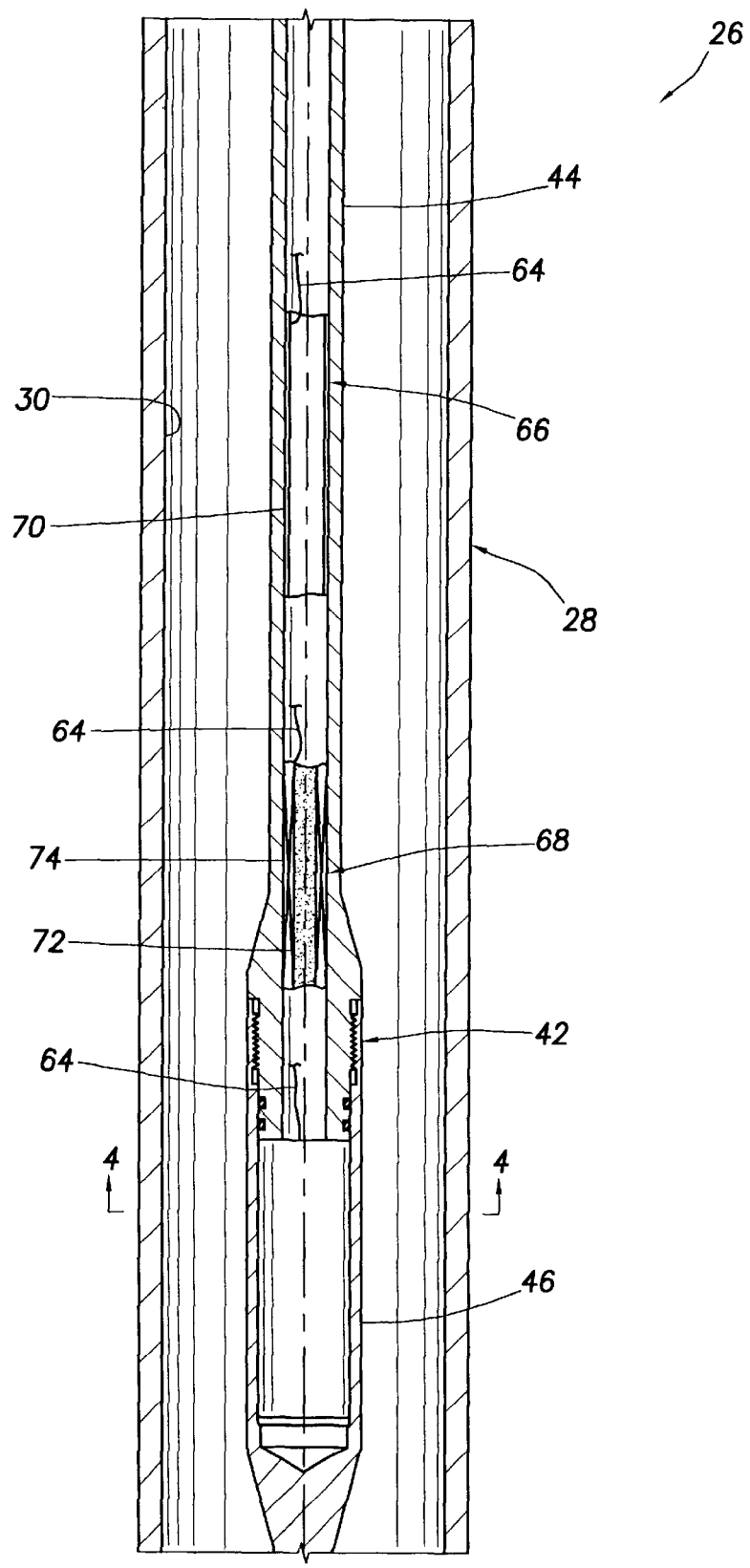
Figure 2F:
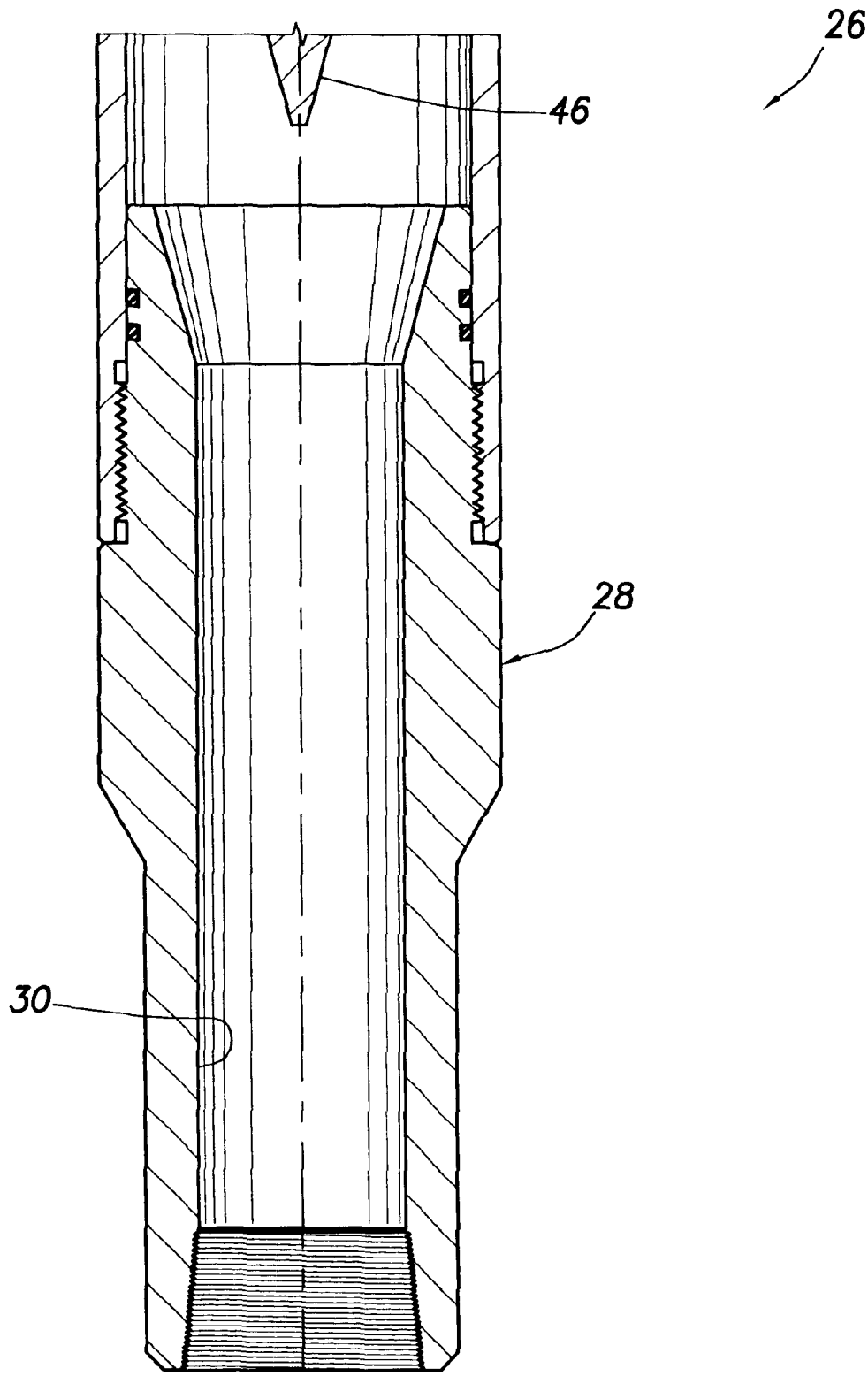
Figure 4:
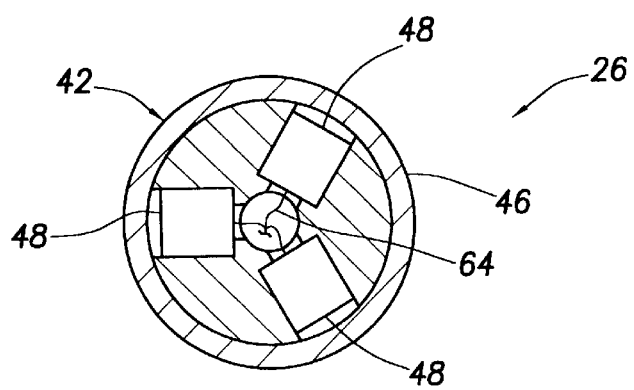
FIG. 4 is a cross-sectional view of a portion of the first apparatus taken also line 4—4 of FIG. 2E.

Referring additionally now to FIG. 4, a cross-sectional view taken through the nose 46 along line 4—4 of FIG. 2E is representatively illustrated. In this view it may be seen that the nose 46 contains multiple power generating assemblies 48 therein. As depicted in FIG. 4, there are three power generating assemblies 48 within the nose 46, with the assemblies being equally spaced angularly with respect to each other.

The power generating assemblies 48 respond to the vibration of the power generating structure 42 by generating electrical power. The varied angular distribution of the power generating assemblies 48 ensures that, no matter the lateral direction of the vibration, at least one of the assemblies will appropriately respond to the vibration by generating electrical power therefrom.

Any number and any orientation of the assemblies 48 may be used, without departing from the principles of the present invention. For example, there could be four of the assemblies 48, instead of three, and they could be differently angularly spaced, such as by positioning the assemblies orthogonal to each other, etc.

FIG. 4 depicts only one level of the assemblies 48 within the nose 46, but there may be multiple levels above or below the one shown in FIG. 4. For example, there could be three levels of three assemblies 48 each, for a total of nine assemblies within the nose 46. All of the assemblies 48 could be oriented in the same direction, or they could be oriented in a different direction on each level, the assemblies could each be oriented differently on the same level, etc. For example, each level could include one of the assemblies 48, with each assembly being positioned orthogonal to the assemblies on the next adjacent levels, etc.

Figure 5:
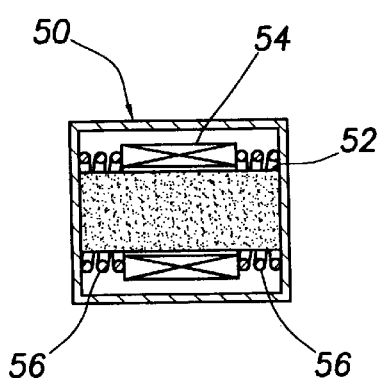
FIG. 5 is a cross-sectional view of a first power generating assembly usable in the first apparatus.

Representatively illustrated in FIG. 5 is an example of a power generating assembly 50 which may be used for one or more of the assemblies 48 in the power generator 26. The assembly 50 includes a central generally cylindrical magnet 52 and a coil 54 circumscribing the magnet. The coil 54 is biased toward a central axial position relative to the magnet 52 by two opposing springs or other bias members 56.

It will be readily appreciated that, when there is relative axial displacement between the coil 54 and the magnet 52, an electric current will be generated in the coil. If the assembly 50 is used in the power generator 26, displacement of the coil 54 relative to the magnet 52 will occur when the structure 42 vibrates in response to fluid flow through the passage 30. The springs 56 ensure that the coil 54 is appropriately positioned relative to the magnet 52, so that when the member 44 displaces laterally, the coil will displace relative to the magnet.

Of course, the assembly 50 may be differently configured, without departing from the principles of the present invention. For example, the magnet 52 may be an electromagnet. As another example, the coil 54 may be rigidly mounted, with the magnet 52 displacing in response to vibration of the assembly 50.

The power generating structure 42 has a natural frequency of vibration at which the member 44 displaces laterally in response to the fluid flow through the passage 30. This natural frequency may be adjusted using techniques described above, such as changing the rigidity of the member 44, changing the mass of the nose 46, etc. It will be readily appreciated that the displacement of the coil 54 relative to the magnet 52 also has a natural frequency, which may also be adjusted, for example, by changing the spring rate of the springs 56, changing the mass of the coil 54, etc. It will further be appreciated that increased displacement of the coil 54 relative to the magnet 52 may be achieved by matching the natural frequency of the assembly 50 to the natural frequency of the power generating structure 42. In this way, the power generating structure 42 will vibrate at a frequency that will produce maximum electrical power output from each of the assemblies 48.

Figure 6:
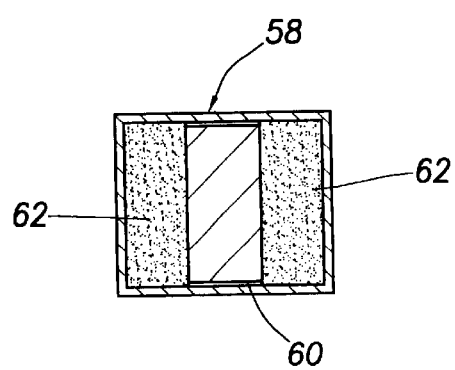
FIG. 6 is a cross-sectional view of a second power generating assembly usable in the first apparatus.

Representatively illustrated in FIG. 6 is another example of a power generating assembly 58 which may be used for one or more of the assemblies 48 in the structure 42. The assembly 58 includes a mass 60 positioned between piezoelectric crystals 62. As the assemble 58 is vibrated laterally, the mass 60 bears on alternating ones of the crystals 69, thereby alternately inducing strain in each of the crystals.

As is well known, piezoelectric materials generate an electric current when strain is induced therein. Thus, when the assembly 58 is vibrated laterally, electric current is produced by the crystals 62.

It is not necessary for the assembly 50 or 58 to be used for one or more of the assemblies 48, since other types of power generating assemblies may be used without departing from the principles of the present invention. Furthermore, it is not necessary for the power generating assemblies 48 to be positioned within the nose 46 of the structure 42. For example, FIG. 2E depicts alternate power generating assemblies 66, 68, which are distributed along the length of the member 44.

The power generating assembly 66 includes a piezoelectric material 70 applied to an internal surface of the member 44. The piezoelectric material 70 is relatively thin as compared to the wall thickness of the member 44 and may be applied as a film adhered to the member's surface, or as a coating. An example of a material which may be suitable for use as the piezoelectric material 70 is known as PZT. Of course, the piezoelectric material 70 may be otherwise positioned reality e to the member 44, such as externally, and may be otherwise applied or attached to the member, without departing from the principles of the present invention.

As the member 44 oscillates laterally in response to fluid flow through the passage 30, it will be readily appreciated that such flexing of the member will induce strain in the piezoelectric material 70. In response to this strain, the piezoelectric material 70 generates an electric current. Thus, as the member 44 repetitively displaces relative to the housing assembly 28, the power generating assembly 66 produces corresponding repetitive electric currents.

The power generating assembly 68 includes a magnetostrictive material 72 positioned within a coil 74, with both the material and the coil being positioned within the member 44. A suitable material for the magnetostrictive material 72 is known as Terfenol-D, available from Etrema Products, Inc. When strain is induced in the material 72, it produces a magnetic field about the coil 74, thereby causing an electric current to be generated in the coil. Of course, the magnetostrictive material 72 and the coil 74 may be otherwise positioned relative to the member 44 and may be otherwise configured, without departing from the principles of the present invention.

As the member 44 oscillates in response to fluid flow through the passage 30, it will be readily appreciated that strain is induced in the magnetostrictive material 72. In response to this strain, the magnetostrictive material 72 generates a magnetic field and an electric current is produced in the coil 74. Thus, as the member 44 repetitively displaces relative to the housing assembly 28, the power generating assemble 68 produces corresponding repetitive electric currents.

Referring again to FIG. 4, the electrical output of the assemblies 48 is conducted via lines or conductors 64 upwardly through the member 44. For example, if the assembly 50 of FIG. 5 is used for the assemblies 48, the coil 54 is connected to the conductors 64, and if the assembly 58 of FIG. 6 is used, the piezoelectric crystals 62 are connected to the conductors 64. If the alternative power generating assembly 66 is used, the conductors 64 are connected to the piezoelectric material 70, and if the alternative power generating assembly 68 is used, the conductors are connected to the coil 74, as depicted in FIG. 2E.

As may be seen in FIG. 2D, the conductors 64 are connected to a power storage and conversion unit 76, which is described in further detail below. The unit 76 is, in turn, connected to an inductive coupling 78 of the type well known to those skilled in the art.

As depicted in FIGS. 2A–D, the inductive coupling 78 is connected to a downhole tool 80 contained within the housing assembly 28. Alternatively, the inductive coupling 78 may be connected to a downhole tool remote from the power generator 26, as depicted in FIG. 1, wherein the valve 20 is connected via lines 22 to the power generator 18.

The inductive coupling 78 permits convenient electrical connection and disconnection between the power generating structure 42 and the remainder of the power generator 26. This arrangement enables the structure 42 to be retrieved from the well in the event that it requires maintenance, upgrading, etc., or access is required to the passage 30 below the structure 42. Of course, other means of electrically connecting the structure 42 to a downhole tool may be utilized without departing from the principles of the present invention. For example, a device known to those skilled in the art as a "wet connect" may be used, the structure 42 may be directly connected to the tool 80, etc.

To retrieve the structure 42 from within the power generator 26, a conventional tool, well known to those skilled in the art, is engaged with the lock 40, the lock is released from the profile 38, and the lock and structure are displaced upwardly out of the power generator. These steps are reversed to replace the structure 42 and lock 40 in the housing assembly 28. However, it is not necessary, in keeping with the principles of the present invention, for the structure 42 to be retrievable or otherwise releasably secured in the power generator 26.

Figure 7:
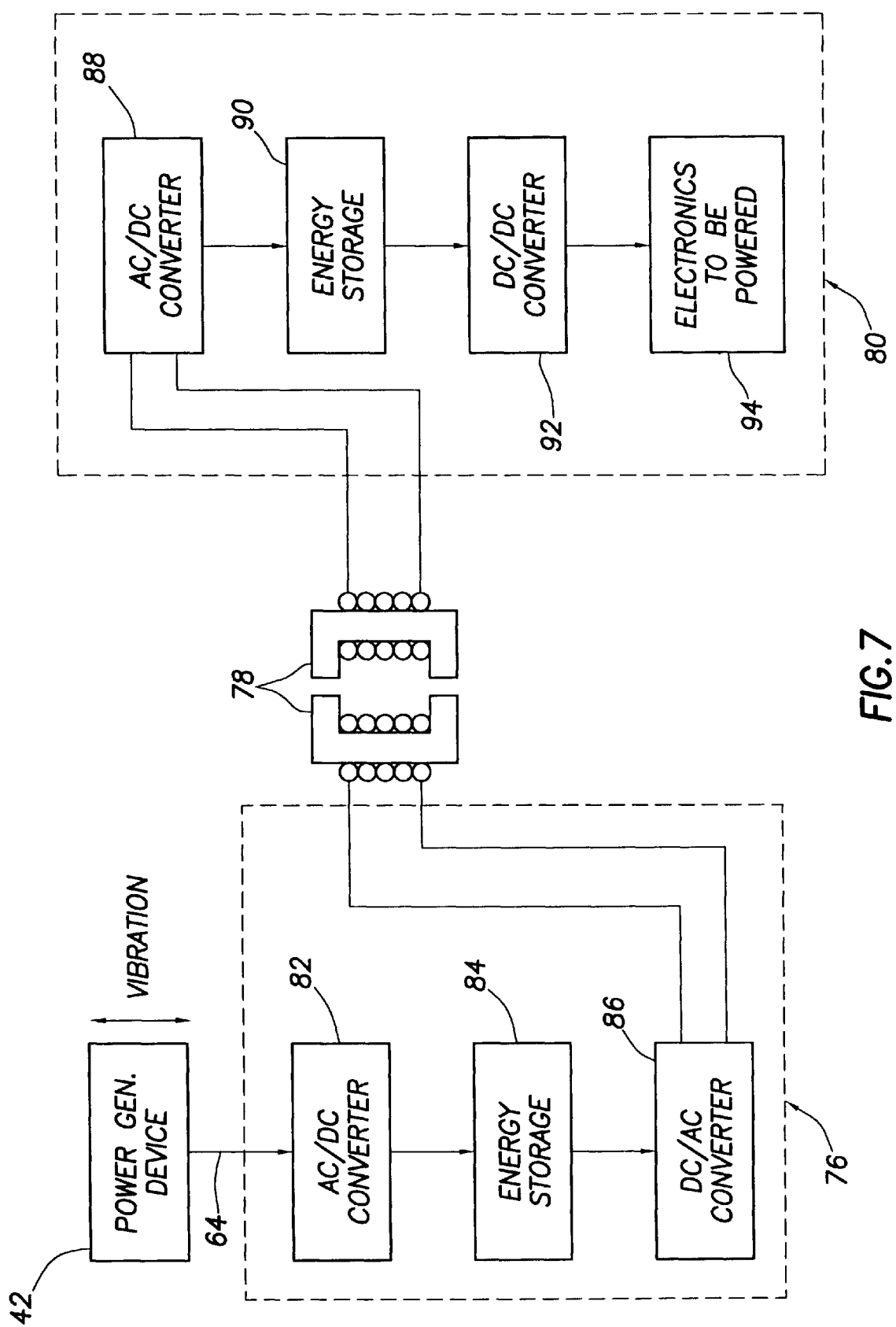
FIG. 7 is a schematic diagram of power generation, storage, conversion and connection in the first apparatus.

Referring additionally now to FIG. 7, a schematic diagram of electrical power generation, storage, conversion and connection in the power generator 26 is representatively illustrated. In FIG. 7, the structure 42 is depicted as a power generating device which produces electrical power in response to vibration. Electrical power is communicated via conductors 64 from the structure 42 to the unit 76 as described above.

The unit 76 includes an AC to DC converter 82, an energy storage device 84 and a DC to AC converter 86. As will be readily appreciated the electrical power generated in response to vibration of the member 44 as described above is or the AC type, in that the current is not constant, but is instead repetitive. although not necessarily sinusoidal. The converter 82 is used to convert the generated power to a DC-type output, which is then stored in the device 84. The device 84 may be a battery or any other type of energy storage device.

The converter 86 is used to convert an output of the device 84 into an AC-type signal, since this is the preferred mode of transmitting power across the inductive coupling 78. However, it is to be clearly understood that it is not necessary for the unit 76 to include the specific elements 82, 84, 86 described above, or for the output of the structure 42 to be converted to a DC-type signal, stored in an energy storage device, and then converted back into an AC-type signal. A great variety of other means for converting the output of the power generating structure 42 into usable electrical power may be substituted for the representatively illustrated unit 76, without departing from the principles of the present invention.

Once electrical power has been transmitted across the inductive coupling 78, it is connected to the tool 80 as described above. The tool 80 may include an AC to DC converter 88, an energy storage device 90, such as a batter, a DC to DC converter 92 and electronics or other electrical equipment to be powered 94. The equipment 94 may, for example, be a pressure or temperature sensor, a solenoid used to actuate a valve, a downhole data storage device, a communication device, etc.

Of course, certain of these elements 88, 90, 92 may not be needed or desired. For example, if the electrical equipment 94 may be powered directly from the AC signal transmitted across the inductive coupling, the converters 88, 92 and energy storage device 90 may not be needed. As another example, if the voltage output of the energy storage device 90 does not need to be converted prior to use by the electrical equipment 94, the converter 92 may not be needed.

It is to be clearly understood that the unit 76 and tool 80 as described above are given merely as examples of the wide variety of implementations of the principles of the present invention, and various changes may be made to their configurations, without departing from the principles of the present invention. For example, if the power generator 26 is used for the power generator 18 in the method 10 depicted in FIG. 1, the valve 20 may only have an electrical actuator therein, with the remaining elements 88, 90, 92 of the tool 80 shown in FIG. 7 being included in the power generator. Thus, it is not necessary, in keeping with the principles of the present invention, for the various electrical elements of the unit 76 or tool 80 to be configured, positioned, included or arranged as representatively illustrated in FIG. 7.

Figure 8A:
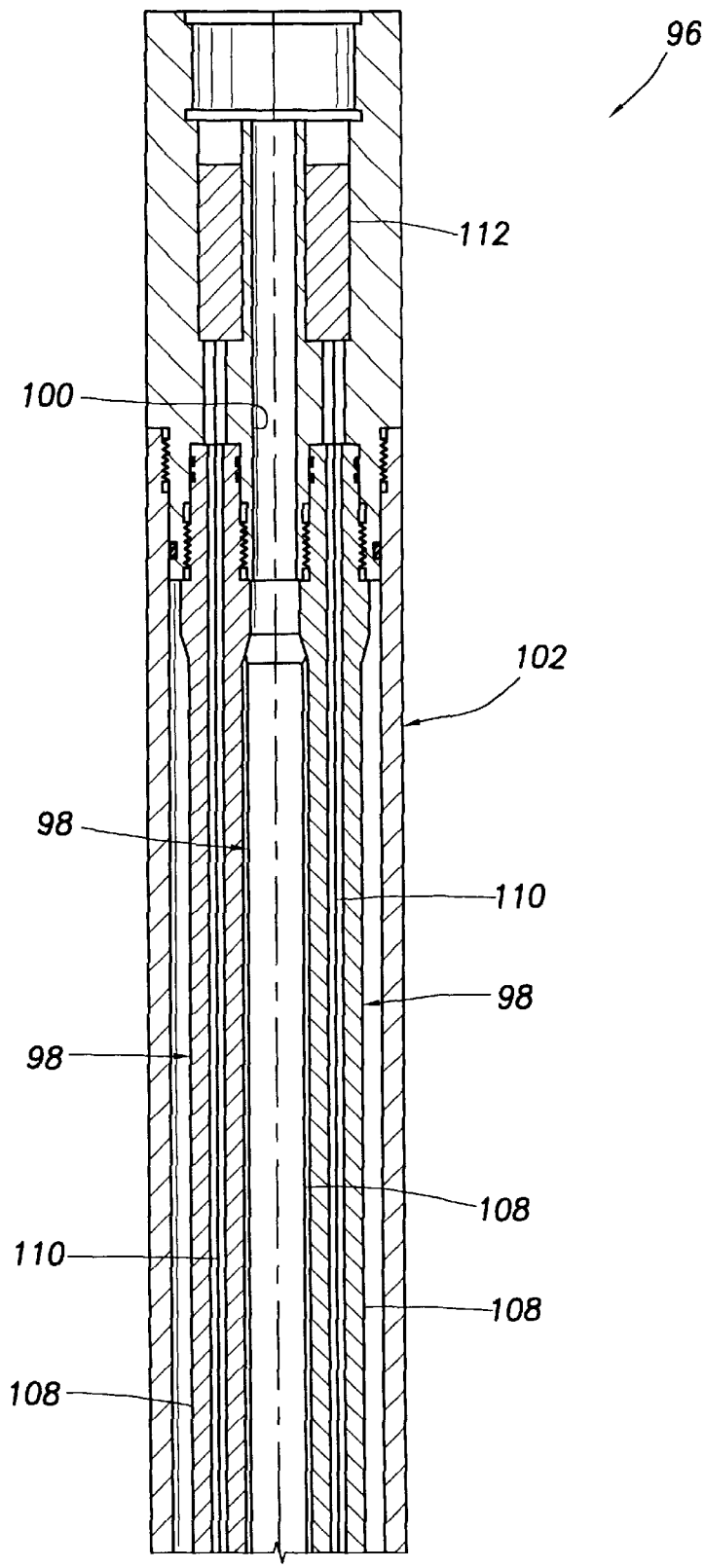
FIGS. 8A & B are cross-sectional views of successive axial sections of a second apparatus usable in the method of FIG. 1.

Referring additionally now to FIGS. 8A & B, an alternate configuration of a downhole power generator 96 embodying principles of the present invention is representatively illustrated. The power generator 96 is similar in many respects to the power generator 26 described above, but differs in at least one substantial respect in that it includes multiple power generating structures 98. The power generating structures 98 are distributed circumferentially about a central axial flow passage 100 formed through a housing assemble 102. Some of the benefits of the positioning of the structures 98 about the passage 100 are reduced flow restriction and improved access to the flow passage 100 below the structures 98.

Figure 8B:
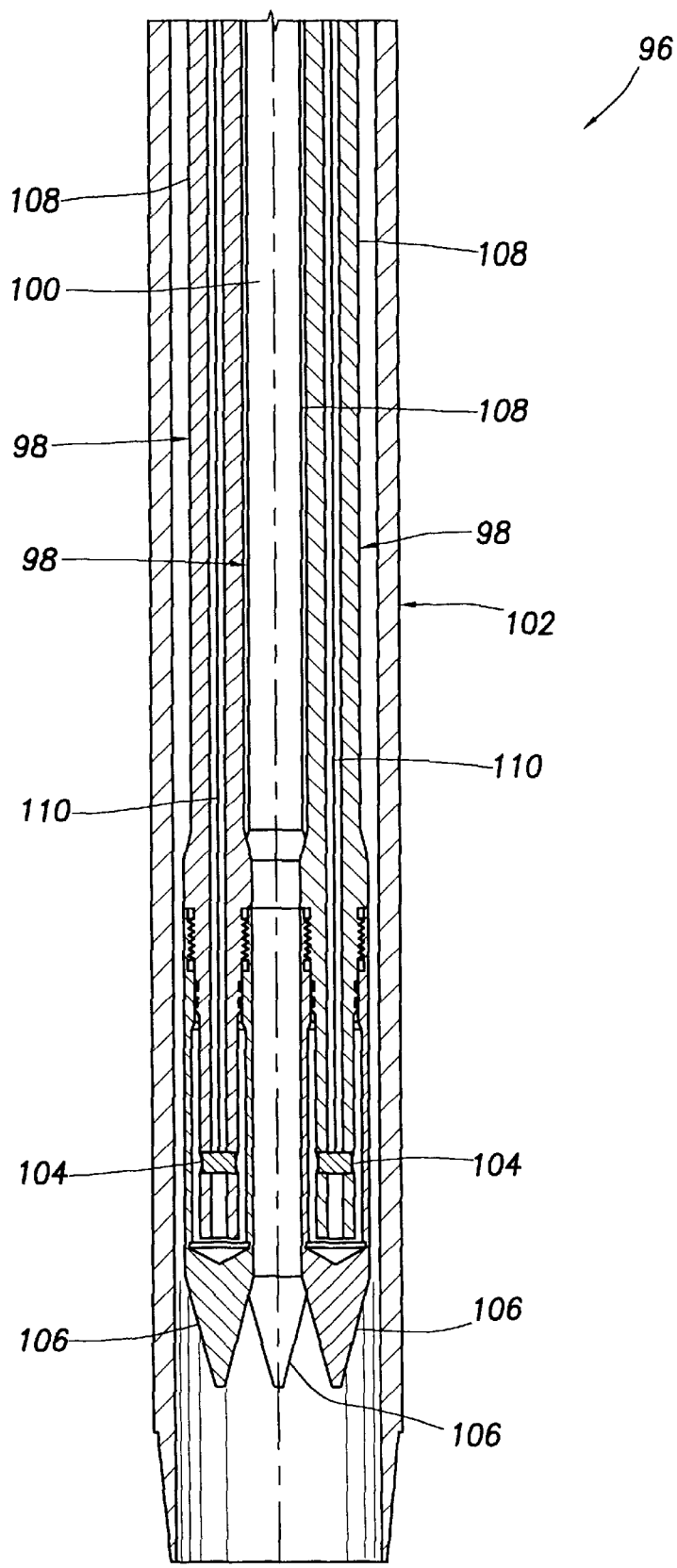

Each of the structures 98 is depicted in FIG. 8B as having a single power generating assembly 104 within a nose 106 and attached to an elongated member 108. Thus, the structures 98 are very similar to the structure 42 described above. Note that each structure 98 may include multiple ones of the power generating assemblies 104, and any of the power generating assemblies 50, 58, 66, 68 described above may be used for the assemblies 104 in the structures 98, without departing from the principles of the present invention.

Fluid flow through the passage 100, either upwardly or downwardly as viewed in FIGS. 8A & B, causes the structures to vibrate. Vibration of the structures 98 causes the power generating assemblies 104 to generate electrical power. The electrical power is transmitted, via conductors 110, to a power storage and conversion unit 112. The unit 112 may be connected to a separate downhole tool, such as the valve 20 in the method 10, or a downhole tool may be included in the power generator 96, such as the tool 80 in the power generator 26 described above.

Note that the power generator 96 does not include a lock or inductive coupling, and the power generating structures 98 are not retrievable from the power generator while it is downhole. It is to be clearly understood, however, that these features of the power generator 26 may be incorporated into the power generator 96 without departing from the principles of the present invention.

Referring additionally now to FIGS. 9 & 9A, an alternate configuration of a nose 150 embodying principles of the present invention is representatively illustrated. The nose 150 may be substituted for either the nose 46 in the apparatus 26 or the nose 106 in the apparatus 96, or in other apparatus incorporating principles of the present invention.

The nose 150 includes an elongated generally tubular body 152 and a substantially solid end portion 154. The end portion 154 has a lower linear edge or blade 156 formed thereon. Of course, it is not necessary in keeping with the principles of the present invention for the body 152 to be tubular, or for the end portion 154 to be substantially solid.

In a preferred manner of using the nose 150, the end portion 154 faces into fluid flow through a housing, as would be the case if the nose were substituted for either the nose 46 or 106 in the apparatus 26 or 96 as described above. However, it is to be clearly understood that the nose 150 and its end portion 154 may face in the direction of the fluid flow, transverse to the fluid flow, oblique to the fluid flow, or in any other direction, without departing from the principles of the present invention.

It will be readily appreciated by one skilled in the art that fluid flowing about the nose 150 will be deflected and will have its momentum otherwise changed in a manner different from that caused by fluid flow about the nose 46 or 106 described above. As a result, the member 44 or 105 will be vibrated differently in response to the fluid flow. This difference in vibration may be in the amplitude or frequency of the vibration, or both. Thus, the nose 150 provides a device for adjusting the amplitude and/or frequency of vibration of the member 44 or 108 in response to fluid flow through the housing 28 or 102.

It will further be readily appreciated that other elements of the power generator 26 or 96 may be configured to produce differences in the vibration of the member 44 or 108. For example, flow deflectors (not shown) may be positioned within the housing assembly 28 or 102 to create turbulence in, or otherwise change the momentum of, fluid flowing through the housing assembly, the member 44 or 108 itself may be configured to deflect fluid flowing about it, to such as by forming one or more flow deflectors on the member, etc. Therefore, any manner of, or device for, changing the momentum of fluid flowing through the housing 28 or 102, and any manner of, or device for, altering the amplitude and/or frequency of vibration of the member 44 or 108 in response to the fluid flow may be utilized, without departing from the principles of the present invention.

Figure 11:
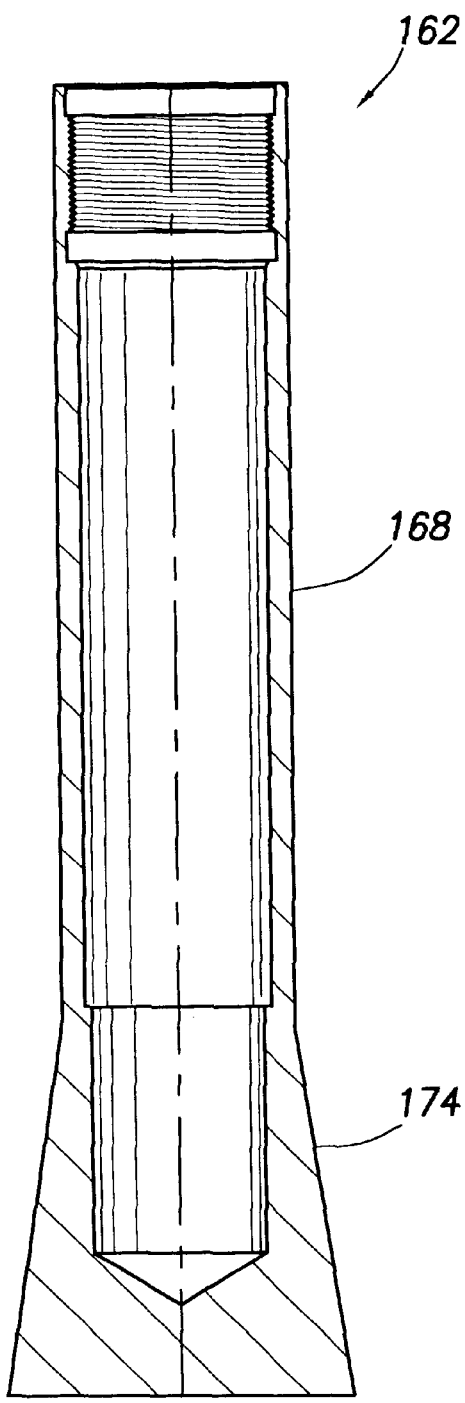
FIG. 11 is a cross-sectional view of a third alternate nose for use with the first or second apparatus.
Figure 12:
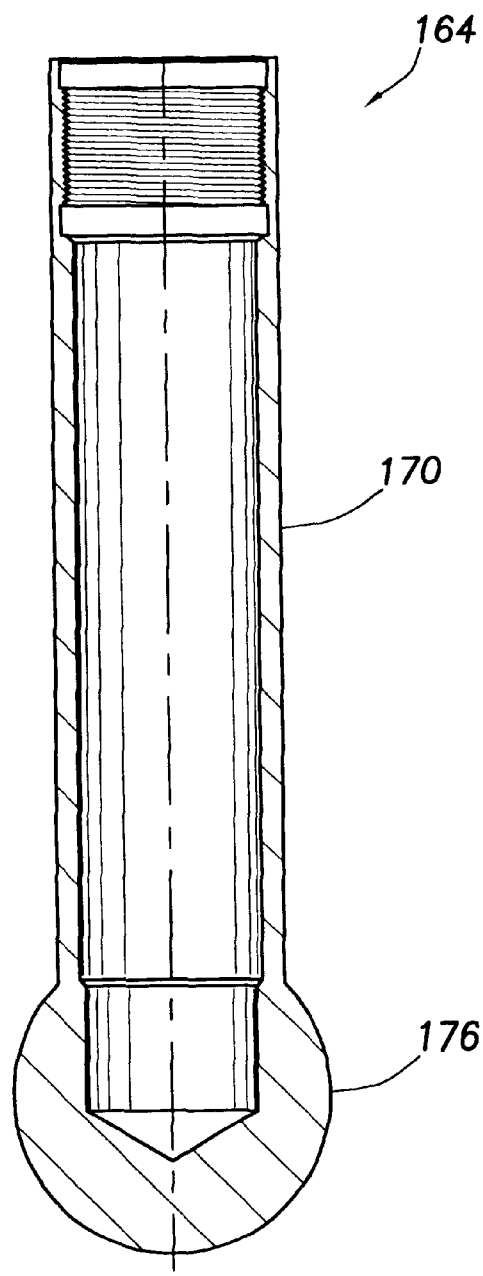
FIG. 12 is a cross-sectional view of a fourth alternate nose for use with the first or second apparatus.

In FIGS. 10–12 are representatively illustrated additional alternately configured noses 160, 162, 164. Each of these noses 160, 162, 164 may be used in place of the nose 46 or 106 of the power generator 26 or 96. It is to be understood that the noses 46, 106 of the power generators 26, 96 and the alternate noses 150, 160, 162, 164 described herein are given merely as examples of the wide variety of different nose configurations which may be used, and as examples of the wide variety of methods of altering the vibration of the member 44, 108 in response to fluid flow, in keeping with the principles of the present invention, and are not to be taken as limiting those configurations and methods.

Each of the noses 160, 162, 164 includes a generally tubular body portion 166, 168, 170 and an end portion 172, 174, 176, respectively. Preferably, the respective end portion 172, 174, 176 faces into fluid flow through the housing 28 or 102, but could face in another direction if desired.

The end portion 172 of the nose 160 is generally cross- or X-shaped when viewed from its downward end as depicted in FIG. 10. The cross shape results from recesses 178 formed into the generally cylindrical end portion 172. The end portion 174 of the nose 162 has a generally flat circular shape when viewed from its downward end as depicted in FIG. 11. The end portion 176 of the nose 164 has a generally spherical shape as depicted in FIG. 12.

It will be readily appreciated by one skilled in the art that the various shapes of the end portions 154, 172, 174, 176 of the noses 150, 160, 162, 164 will produce correspondingly varied changes in momentum of the fluid flowing about the noses. Thus, the noses 150, 160, 162, 164 will each produce a different vibration of the member 44 or 108 in response to the fluid flow through the housing, 28 or 102.

Figure 13:
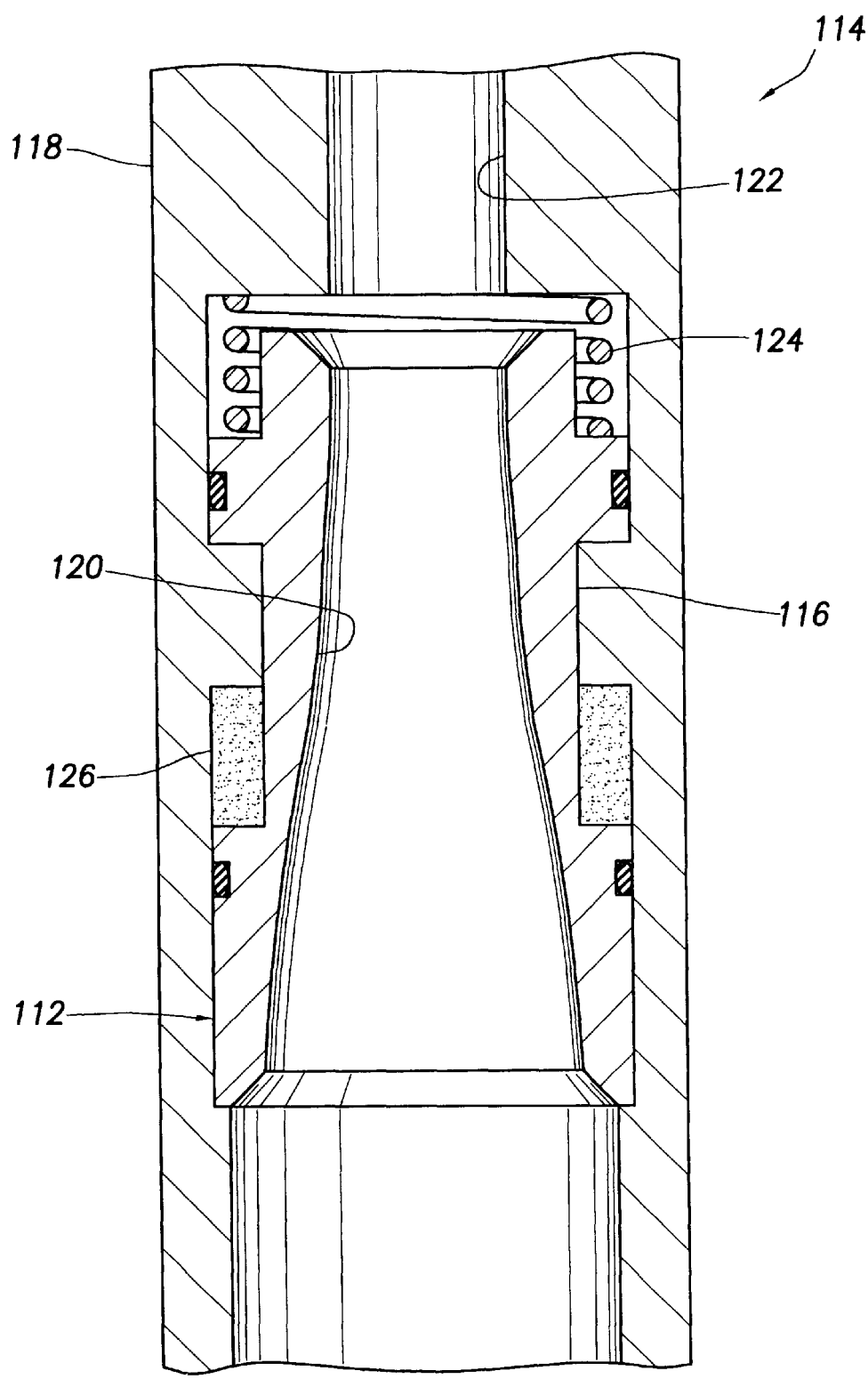
FIG. 13 is a schematic cross-sectional view of a third apparatus usable in the method of FIG. 1.

Referring additionally now to FIG. 13, another downhole power generator 114 embodying principles of the present invention is schematically and representatively illustrated. In the power generator 114, a member is not vibrated laterally in response to fluid flow as in the power generators 26, 96 described above. Instead, the power generator 114 has a power generating structure 112 which includes a member or nozzle 116 which is vibrated axially in response to fluid flow therethrough. The nozzle 116 may also be described as a venturi, although it is not necessary in keeping with the principles of the present invention for the vibrated member in the power generator 114 to create an increase in fluid velocity therethrough or to create a reduction in fluid pressure.

The nozzle 116 is reciprocally disposed within a housing 118 of the power generator 114. The nozzle 116 has a flow passage 120 formed axially therethrough which is in fluid communication with a flow passage 122 formed axially through the housing 118. Thus, the housing 118 may be interconnected in the tubular string 14 in the method 10, in which case fluid flowing through the tubular string will also flow through the nozzle 116.

The nozzle 116 is configured so that it causes a change in pressure in the fluid flowing through the passage 120. As depicted in FIG. 13, the passage 120 has a reduced diameter at an upper end of the nozzle 116. It will be readily appreciated by one skilled in the art that, as fluid flows upwardly through the passage 120, its velocity will increase and its pressure will decrease due to the reduced diameter of the passage 120 at the upper end of the nozzle 116. Thus, the shape of the nozzle 116 causes a differential pressure across the nozzle as fluid flows therethrough.

The differential pressure across the nozzle 116 biases the nozzle upwardly. Upward displacement of the nozzle 116 relative to the housing 118 is resisted, however, by a spring or other bias member 124. It will be readily appreciated by one skilled in the art that the differential pressure created across the nozzle 116 due to the fluid flow therethrough is not constant, but continuously varies. This varying differential pressure causes the nozzle 116 to vibrate axially relative to the housing 118.

One or more piezoelectric crystals 126 (only one of which is shown in FIG. 13) is positioned between the nozzle 116 and the housing 118 so that, as the nozzle 116 vibrates, strain is induced in the piezoelectric crystal. In effect, the crystal 126 is repetitively compressed between the nozzle 116 and the housing 118, thereby causing the crystal to generate a corresponding repetitive electrical output in response.

Although not shown in FIG. 13, the crystal 126 may be connected to a power storage and/or conversion unit, such as the unit 76 of the power generator 26, and the power generator 114 may include other features of the power generators 26, 96. For example, the power generator 114 could include an inductive coupling and lock so that the structure 112 is retrievable from the power generator. Thus, the specific construction and configuration of the power generator 114 may be changed, without departing from the principles of the present invention.

Figure 14:
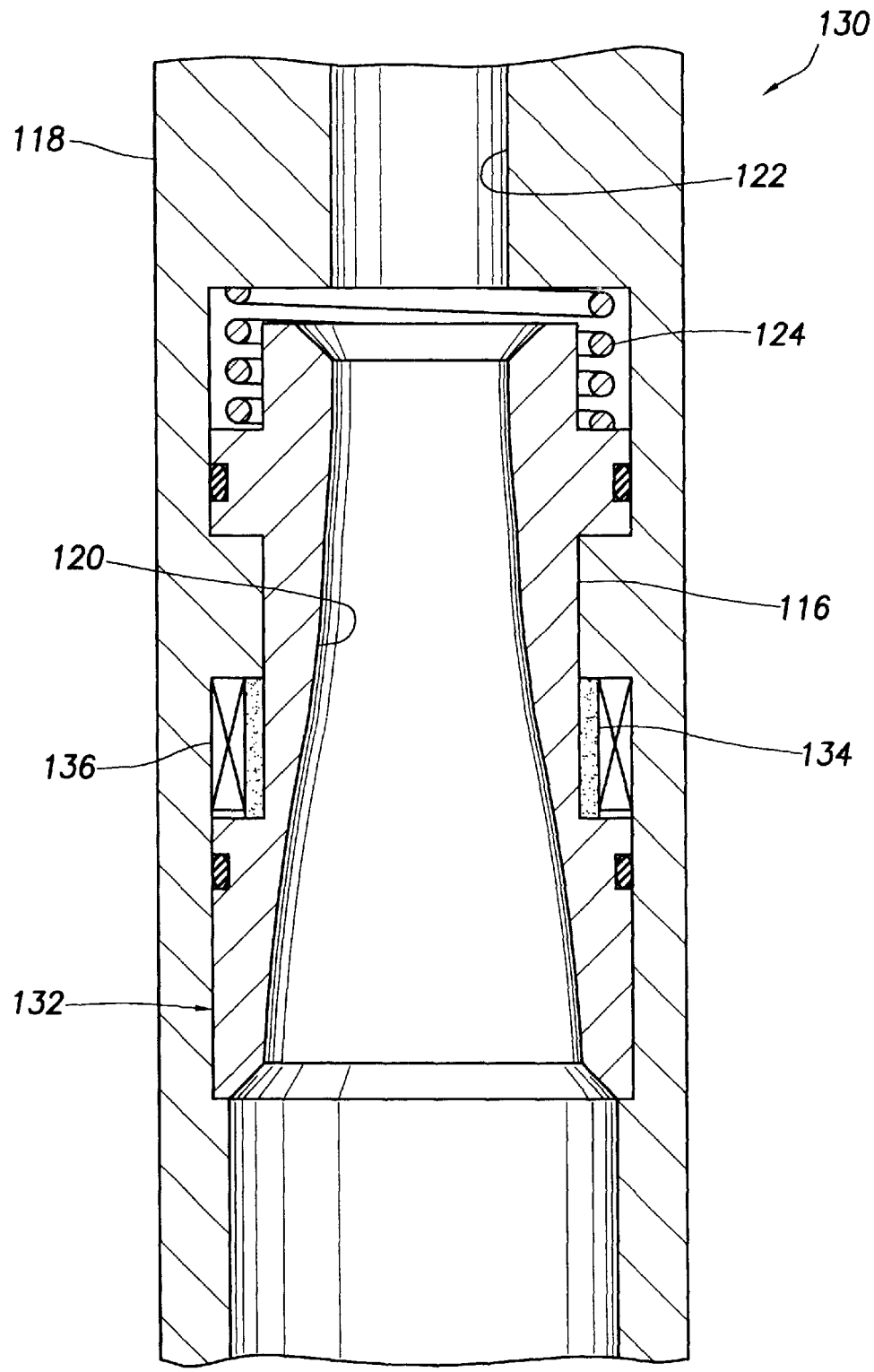
FIG. 14 is a schematic cross-sectional view of a fourth apparatus usable in the method of FIG. 1.

Referring additionally now to FIG. 14, another downhole power generator 130 embodying principles of the present invention is schematically and representatively illustrated. The power generator 130 is similar in many respects to the power generator 114 described above, and so elements shown in FIG. 14 which are similar to those previously described are indicated using the same reference numbers.

The power generator 130 includes a power generating structure 132, which in turn includes the nozzle 116. However, instead of the piezoelectric crystal 126 of the power generator 114, the power generating structure 132 includes a magnetostrictive material 134 and a coil 136. The magnetostrictive material 134 is positioned between the nozzle 116 and the housing 118, and at least partially within the coil 136. Of course, this configuration may be changed, without departing from the principles of the present invention.

The nozzle 116 vibrates in response to fluid flow therethrough as described above. Vibration of the nozzle 116 induces strain in the magnetostrictive material 134, causing it to generate a magnetic field about the coil 136. The magnetic field causes the coil 136 to produce an electric current. Thus, the material 134 is repetitively compressed between the nozzle 116 and the housing 118, thereby causing the coil 136 to generate a corresponding repetitive electrical output in response.

As with the power generator 114 described above, the power generator 130 may be differently configured, may include a power storage and/or conversion unit, and may include other features of the power generators 26, 96, without departing from the principles of the present invention.

Figure 15:
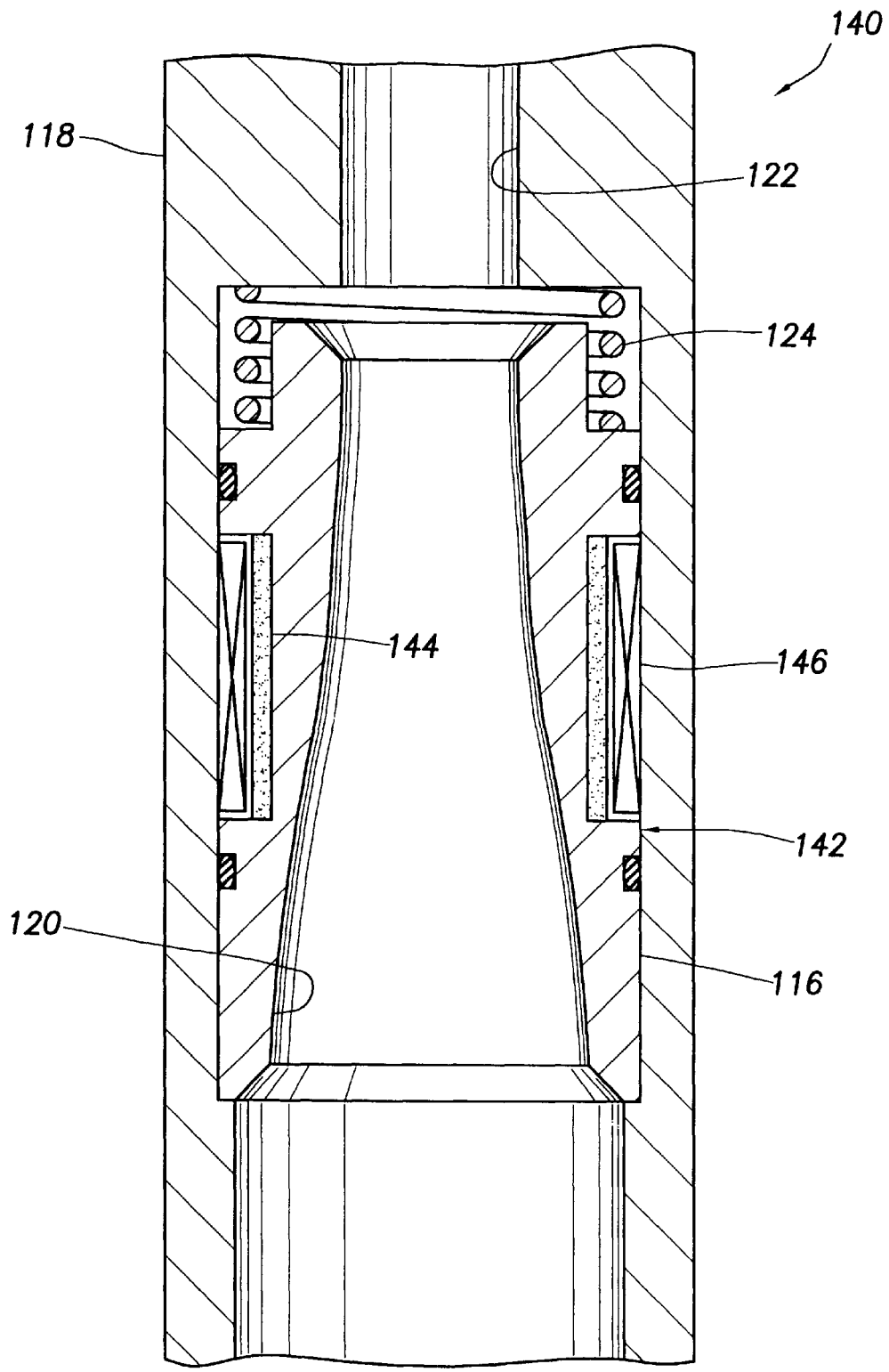
FIG. 15 is a schematic cross-sectional view of a fifth apparatus usable in the method of FIG. 1.

Referring additionally now to FIG. 15, another downhole power generator 140 embodying principles of the present invention is schematically and representatively illustrated. The power generator 140 is similar in many respects to the power generators 114, 130 described above, and so elements shown in FIG. which are similar to those previously described are indicated using the same reference numbers.

The power generator 140 includes a power generating structure 142, which in turn includes the nozzle 116. However, instead of compressing a material or crystal between the nozzle 116 and the housing 118, a magnet 144 is displaced relative to a coil 146. The magnet 144 is attached to the nozzle 116 and the coil 146 is attached to the housing 118, with the magnet being positioned within the coil. Of course, this configuration may be changed, without departing from the principles of the present invention.

The nozzle 116 vibrates in response to fluid flow therethrough as described above. Vibration of the nozzle 116 displaces the magnet 144 relative to the coil 146, thereby producing an electric current in the coil. Thus, as the nozzle repetitively displaces axially relative to the housing 118, the coil 146 generates a corresponding repetitive electrical output in response.

As with the power generators 114, 130 described above, the power generator 140 may be differently configured, may include a power storage and/or conversion unit, and may include other features of the power generators 26, 96, without departing from the principles of the present invention.

Figure 16:
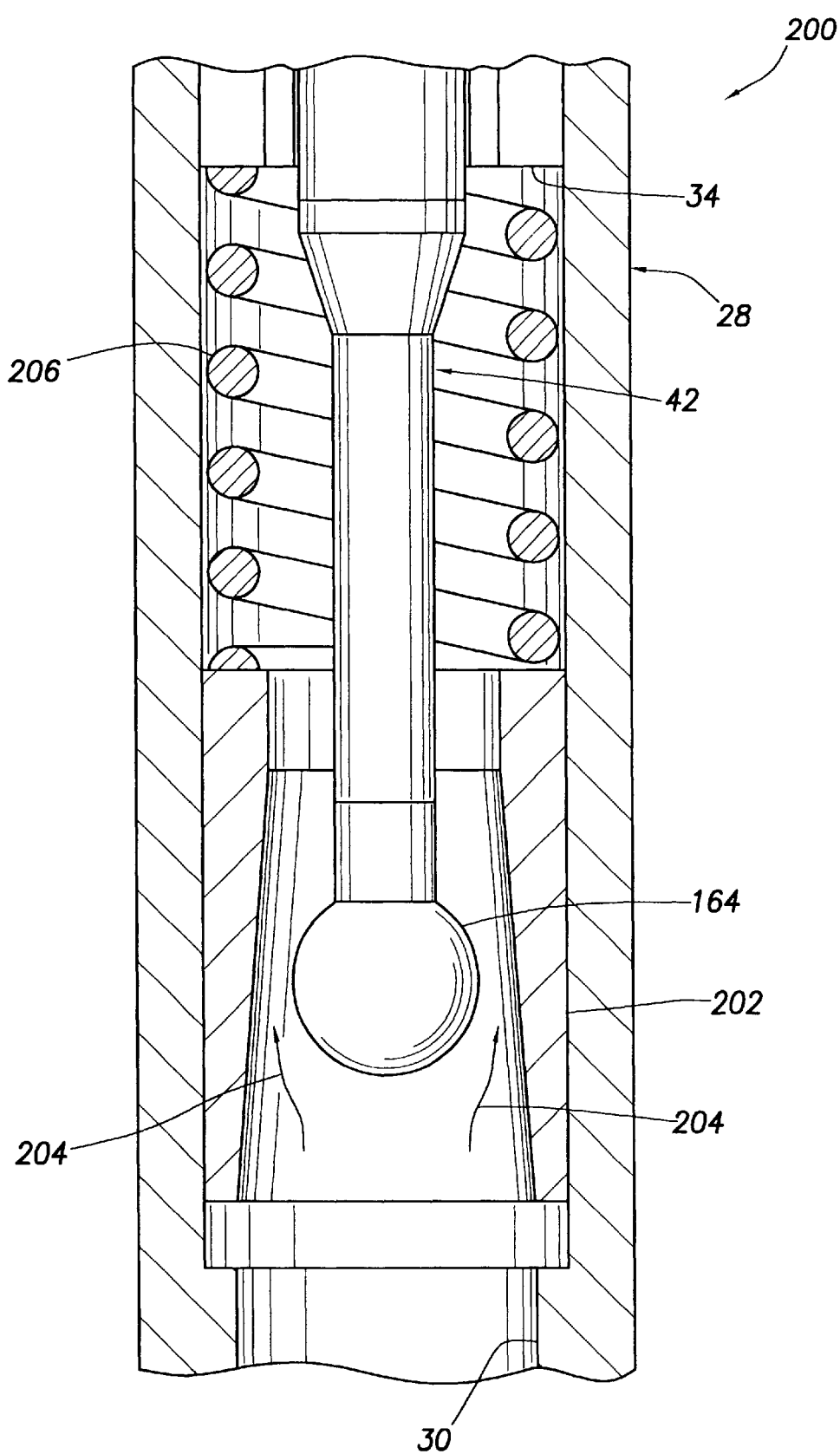
FIG. 16 is a schematic cross-sectional view of an alternate configuration of the first apparatus.

Referring additionally now to FIG. 16, an alternate embodiment of the power generator 26, indicated as a power generator 200, embodying principles of the present invention is representatively and schematically illustrated. Only a portion of the power generator 200 is depicted in FIG. 16, it being understood that the remainder of the power generator is substantially similar to the power generator 26 shown in FIGS. 2A–F and described above. Additionally the power generating structure 42 of the power generator 200 as illustrated in FIG. 16 utilizes the alternate nose 164 of FIG. 12 in place of the nose 46.

The power generator 200 includes a nozzle, venturi or member 202 which regulates a response of the power generating structure 42 to the fluid flow (indicated by arrows 204 in FIG. 16) through the passage 30, or, stated differently, the nozzle regulates the effect the flow through the passage has on the power generating structure. This result is accomplished in the embodiment depicted in FIG. 16 by increasing the flow area available for the flow 204 between the nose 164 and the nozzle 202 when the flow rate increases and, conversely, decreasing the flow area when the flow rate decreases. However, it is to be clearly understood that this result may be accomplished in a variety of manners, and the nozzle 202 may be any other type of flow responsive vibration regulating member, without departing from the principles of the present invention.

It will be readily appreciated by one skilled in the art that the fluid flow 204 creates a generally upwardly biasing force on the nozzle 202. A compression spring 206 exerts a downwardly biasing force on the nozzle 202. Thus, the nozzle 202 is displaced upwardly when the upwardly biasing force due to the flow 204 exceeds the downwardly biasing force exerted by the spring 206. As shown in FIG. 16, the nozzle 202 has been displaced somewhat upwardly relative to the power generating structure 42, thereby increasing the flow area between the nose 164 and the nozzle.

Regulation of the response of the power generating structure 42 to variations in the flow 204, or the effect of variations in the flow on the power generating structure, produces many benefits. For example, it may be advantageous in terms of the amount of power generated for the velocity of fluid flow about the nose 164 to remain relatively constant, or to only vary within certain limits, in order to maintain the power generating structure 42 vibrating with maximum amplitude. As another example, an initial relatively high fluid velocity about the power generating structure 42 may be useful in initiating vibration of the structure in response to the fluid flow 204, particularly when the flow rate is relatively small. As yet another example, the nozzle 202 may vibrate in response to the fluid flow 204 and the force exerted by the spring 206, and this vibration and its consequent effect on the fluid flow between the nozzle and the nose 164 may, in turn, be utilized to affect the vibration of the power generating structure 42. These and many other benefits may be realized in the power generator 200, and it is to be clearly understood that the benefits specifically described above may or may not be attained in other power generators embodying principles of the present invention.

Additionally, it is to be clearly understood that FIG. 16 depicts only one manner in which the response of the power generating structure 42 to variations in the flow 204, or the effect of variations in the flow on the power generating structure, may be regulated to beneficial effect. It will be readily appreciated that a variety of means may be used to regulate fluid velocity, turbulence, momentum, etc. about the power generating structure 42 (or within the power generating structures 112, 132, 142 of FIGS. 13–15), or to regulate the effect of such velocity, turbulence, momentum, etc. on the power generating structures. For example, the shape, mass or position of the noses 46, 106, 150, 160, 162, 164 could be altered, the mass, position or flow area through the nozzle 116 could be altered, the spring rate of the springs 124, 206 could be varied, etc. Thus, the response of a power generating structure to changes in fluid flow through a power generator may be regulated in response to the fluid flow changes in any manner without departing from the principles of the present invention.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A downhole power generator, comprising:
    a housing having a first axial flow passage formed therethrough; and
    a power generating structure including a nozzle and a power generating assembly, the nozzle having a second flow passage formed therethrough and in entirely non-valved communication with the first flow passage, the second flow passage having a longitudinal axis, the nozzle vibrating along the longitudinal axis in response to fluid flow through the first and second flow passages, and the power generating assembly producing electrical power in response to the nozzle vibration,
    the power generating assembly including a magnet and a coil, one of the magnet and the coil being attached to the nozzle, and the other of the magnet and the coil being attached to the housing so that, as the nozzle vibrates relative to the housing, relative displacement is produced between the coil and the magnet.

2. The downhole power generator according to claim 1, wherein fluid flow through the second flow passage creates a pressure differential across the nozzle, the pressure differential varying and biasing the nozzle in the direction of the fluid flow.

3. The downhole power generator according to claim 2, further comprising a bias member biasing the nozzle in a direction opposite to the direction of the fluid flow.

4. A method of generating power downhole, the method comprising the steps of:
    flowing fluid in a first direction through a housing interconnected in a tubular string in a well;
    vibrating a structure within the housing in response to the fluid flow through the housing;
    generating electrical power in response to the structure vibration;
    retrievably securing the structure relative to the housing; and
    retrieving the structure from the tubular string separate from the housing while the housing is positioned downhole.

5. A method of generating power downhole, the method comprising the steps of:
    flowing fluid in a first direction through a housing interconnected in a tubular string in a well;
    vibrating a structure within the housing in response to the fluid flow through the housing; and
    generating electrical power in response to the structure vibration,
    wherein the structure includes a coil and a magnet,
    wherein the vibrating step further comprises displacing the coil relative to the magnet, thereby producing an electric current in the coil in the generating step,
    wherein the displacement of the coil relative to the magnet has a natural frequency, and
    wherein the vibrating step further comprises displacing the coil relative to the magnet at the natural frequency.

6. The method according to claim 5, wherein the structure further includes an elongated member secured at one end relative to the housing, displacement of the other end of the member relative to the housing having substantially the same natural frequency as displacement of the coil relative to the magnet, and wherein the vibrating step further comprises displacing the other end of the member relative to the housing at the natural frequency.

7. A method of generating power downhole, the method comprising the steps of:
    flowing fluid in a first direction through a housing interconnected in a tubular string in a well;
    vibrating a structure within the housing in response to the fluid flow through the housing; and
    generating electrical power in response to the structure vibration,
    wherein the structure includes a magnetostrictive material positioned proximate a coil, and
    wherein the vibrating step comprises inducing strain in the magnetostrictive material, thereby producing an electric current in the coil in the generating step.

8. A method of generating power downhole, the method comprising the steps of:
    flowing fluid in a first direction through a housing interconnected in a tubular string in a well;
    vibrating a structure within the housing in response to the fluid flow through the housing;
    generating electrical power in response to the structure vibration; and
    electrically interconnecting the structure to a power-consuming downhole tool via an inductive coupling.

9. A method of generating power downhole, the method comprising the steps of:
    flowing fluid in a first direction through a housing interconnected in a tubular string in a well;

vibrating a structure within the housing in response to the fluid flow through the housing; and generating electrical power in response to the structure vibration, wherein the structure comprises a member, wherein the vibrating step further comprises displacing the member relative to the housing in response to fluid flow through the member, and wherein the generating step further comprises inducing a strain in a magnetostrictive material proximate a coil, thereby creating an electric current in the coil, in response to displacement of the member relative to the housing.

10. A method of generating power downhole, the method comprising the steps of:

flowing fluid in a first direction through a housing interconnected in a tubular string in a well;

vibrating a structure within the housing in response to the fluid flow through the housing, the structure having an interior;

generating electrical power in response to the structure vibration; and regulating the vibration of the structure in response to the fluid flow through the housing, the regulating step being performed in response to a change in the fluid flow through the housing effected by creating relative movement between the structure and a member projecting into the interior of the structure.

11. A downhole power generator, comprising:

a housing having a first flow passage formed therethrough; and a power generating structure including a power generating assembly and a vibrating member, the member vibrating in response to fluid flow through the first flow passage, and the power generating assembly generating electrical power in response to vibration of the member, wherein the power generating assembly includes a coil positioned proximate a magnetostrictive material, vibration of the member causing strain in the magnetostrictive material.

12. A downhole power generator, comprising:

a housing having a first flow passage formed therethrough; and a power generating structure including a power generating assembly and a vibrating member, the member vibrating in response to fluid flow through the first flow passage, and the power generating assembly generating electrical power in response to vibration of the member, wherein the member has a second flow passage formed therethrough in communication with the first flow passage, the member vibrating in response to fluid flow through the second flow passage, and wherein the power generating assembly includes a magnetostrictive material disposed between the member and the housing so that, as the member is vibrated, strain is induced in the magnetostrictive material.

13. A downhole power generator, comprising:

a housing having a first flow passage formed therethrough; and a power generating structure including a power generating assembly and a vibrating member, the member vibrating in response to fluid flow through the first flow passage, and the power generating assembly generating electrical power in response to vibration of the member, wherein the power generating structure is retrievably secured relative to the housing while the housing is positioned downhole.

14. A downhole power generator, comprising:

a housing having a first flow passage formed therethrough; and a power generating structure including a power generating assembly and a vibrating member, the member vibrating in response to fluid flow through the first flow passage, and the power generating assembly generating electrical power in response to vibration of the member, wherein the power generating structure is electrically interconnected to the housing via an inductive coupling.

15. A downhole power generator comprising:

a housing having a first flow passage formed therethrough;

a power -generating structure including a power generating assembly and a vibrating member, the member vibrating in response to fluid flow through the first flow passage, and the power generating assembly generating electrical power in response to vibration of the member; and a regulating member extending into the vibrating member, the regulating member regulating the flow responsive vibration of the vibrating member, and the regulating member being responsive to a change in the fluid flow through the housing.

16. The downhole power generator according to claim 15, wherein the regulating member regulates a velocity of the fluid flow in the housing.

17. The downhole power generator according to claim 15, wherein the regulating member varies a flow area in the housing.

18. The downhole power generator according to claim 15, wherein there is a relative displacement between the regulating member and the vibrating member in response to the change in the fluid flow through the housing.

19. A downhole power generator, comprising:

a generally tubular housing having an axial flow passage formed therethrough; and a power generating structure including a power generating assembly and an elongated member extending into the flow passage, at least one end of the member vibrating laterally relative to the housing in response to fluid flow through the flow passage, and the power generating assembly being attached to the member so that as the member vibrates, the power generating assembly generates electrical power, wherein the power generating assembly includes a coil and a magnetostrictive material, vibration of the member inducing strain in the magnetostrictive material and generating an electric current in the coil.

20. A downhole power generator, comprising:

a generally tubular housing having an axial flow passage formed therethrough; and a power generating structure including a power generating assembly and an elongated member extending into the flow passage, at least one end of the member vibrating laterally relative to the housing in response to fluid flow through the flow passage, and the power generating assembly being attached to the member so that as the member vibrates, the power generating assembly generates electrical power, wherein the power generating assembly includes a mass and a piezoelectric material, vibration of the member causing the mass to induce strain in the piezoelectric material.

21. A downhole power generator, comprising:

a housing having a first axial flow passage formed therethrough; and a power generating structure including a nozzle and a power generating assembly, the nozzle having a second flow passage formed therethrough in communication with the first flow passage, the nozzle vibrating axially relative to the housing in response to fluid flow through the first and second flow passages, the power generating assembly producing electrical power in response to the nozzle vibration, and wherein the power generating assembly includes a magnetostrictive material disposed proximate a coil and axially between at least a portion of the nozzle and at least a portion of the housing so that, as the nozzle axially vibrates relative to the housing, strain is repetitively induced in the magnetostrictive material, thereby producing a magnetic field about the coil.

* * * * *

UNITED STATES PATENT AND TRADEMARK OFFICE
CERTIFICATE OF CORRECTION

PATENT NO. : 6,504,258 B2
DATED : January 7, 2003
INVENTOR(S) : Schultz et al.

It is certified that error appears in the above-identified patent and that said Letters Patent is hereby corrected as shown below:

Title page,
Item [56], References Cited, U.S. PATENT DOCUMENTS, insert:
-- 5,353,873   10/1994   Cooke, Jr.            166/253 --.

Signed and Sealed this

Eighteenth Day of October, 2005

JON W. DUDAS
*Director of the United States Patent and Trademark Office*